July 7, 1970 C. H. LONG 3,518,782
PLACARD HOLDER
Filed Oct. 2, 1967

INVENTOR
CHARLES H. LONG
BY Ralph W. Kalish
ATTORNEY

United States Patent Office 3,518,782
Patented July 7, 1970

3,518,782
PLACARD HOLDER
Charles H. Long, St. Louis, Mo., assignor to Stout Sign Company, St. Louis, Mo., a corporation of Missouri
Filed Oct. 2, 1967, Ser. No. 672,366
Int. Cl. G09f 15/00
U.S. Cl. 40—104.18                                5 Claims

ABSTRACT OF THE DISCLOSURE

A placard holder having a base plate for disposition upon a load-carrying vehicle, a plurality of placards swingably mounted upon said base plate with the adjacent faces of immediately consecutive placards having inscribed or otherwise provided thereon indicia for informing as to the character of the load, and means for retaining the placards in predetermined relationship.

BACKGROUND OF THE INVENTION

Presently effective regulations affecting common carriers require that the same bear signs or markings upon the exterior thereof for indicating the hazardous nature of any load being transported. Thus, for instance, such signs must indicate whether the articles carried are inflammable, corrosive, poisonous, radioactive, explosive, and the like, in order that all in the vicinity thereof may be fully warned so as to follow such evasive conduct as may seem appropriate. The provision of such signs by carriers has proved to be a rather difficult matter since it requires each carrier to maintain a collection of signs which would indicate the precise character of the load and it is easily recognized that a considerable number of such signs are needed in view of the various types of materials to be transported. Too often, a vehicle or truck operator may lose certain signs through inadvertency, while others may be misplaced through normal operations.

Additionally, such signs may very well be subject to wear through exposure to atmospheric conditions. Furthermore, it has been discovered that truck operators are occasioned some hardship in making certain that the appropriate sign is displayed since physical removal of one sign and replacement thereby by another may occasion some difficulty if the sign-support might have become damaged or distorted through usage.

SUMMARY OF THE INVENTION

It is an object of the present invention to provide a placard holder, as for use upon vehicles, which integrally comprises a plurality of engaged placards so that the operator need not maintain an assemblage of individual, detached placards.

It is another object of the present invention to provide a placard holder for mounted disposition upon a vehicle and which incorporates a plurality of placards swingably mounted thereupon; said placards being inter-related so that the adjacent faces of immediately consecutive placards cooperate to present a word or expression designative of the hazardous character of the particular load.

It is a further object of the present invention to provide a placard holder of the type stated which is easily operated so as to present cooperating placards in public-informing relationship; there being means for maintaining the placards in preselected relationship so as to prevent accidental relative displacement.

It is still another object of the present invention to provide a placard holder of the type stated which may be readily mounted in operative position; which is durable and reliable in usage; which may be easily manipulated by the average individual for presenting the appropriate sign; and which obviously has applications beyond the field of common carriers.

DESCRIPTION OF THE PREFERRED EMBODIMENT

Figure 1:
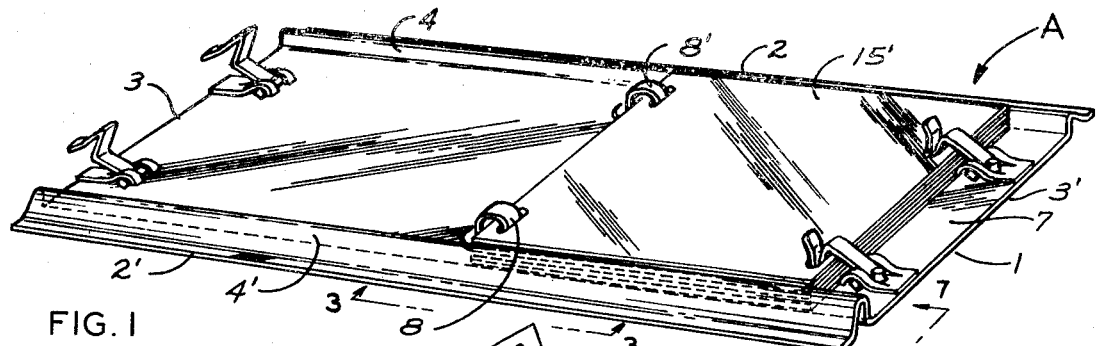
FIG. 1 is a perspective view of a placard holder constructed in accordance with and embodying the present invention illustrating the placards in closed condition.

Referring now by reference characters to the drawing which illustrates the preferred embodiment of the present invention. A, generally designates a placard holder comprising a base plate 1 of general rectangular configuration and formed from suitable sheet stock, having an upper and lower longitudinal edge 2, 2' and vertical side edges 3, 3', respectively; it being understood that under normal usage holder 1 will be mounted upon a suitable vertical surface such as in a convenient location upon the side or end of a truck or the like. Inwardly of each edge 2, 2', base plate 1 is provided with a forwardly projecting bead 4, 4' respectively, co-extensive with said base plate 1 and having an interior, substantially horizontal wall 5 and an outwardly inclined wall 6; said beads 4, 4' serving to lend rigidity to base plate 1, as well as for the confronting horizontal walls 5 thereof cooperating to define the limits of placard-receiping portion, as indicated at 7, of said plate 1. Provided substantially along the vertical center line of plate 1, between beads 4, 4', is a pair of aligned, spaced-apart binders 8, 8', each of which is of general inverted U-shaped form having vertical legs 9, 9', continuous at their upper ends with a rounded bight portion 10. The lower end of leg 9 is continuous with a mounting flange 11 flat-wise disposed upon base plate 1 and fixed thereto, as by rivets 12 or the like. The lower end of leg 9' is continuous with an arcuate extension 13, its free end extremity being upturned, as at 14. Said extension 13 rests upon base plate 1 but is not secured thereto and by reason of the inherent resiliency of binders 8, 8', a user, by appropriate upward pressure against extremity 14, may lift said extension 13 for purposes presently appearing.

Figure 3:
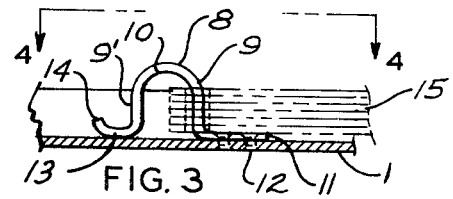
FIG. 3 is a vertical, transverse sectional view taken on the line 3—3 of FIG. 1.
Figure 6:
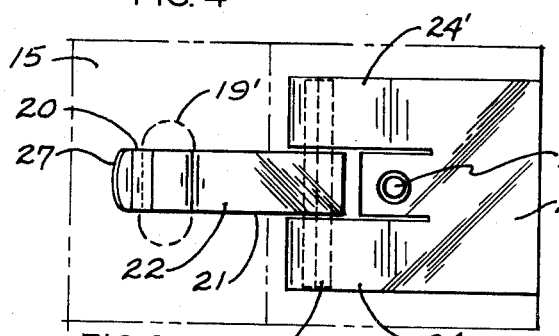
FIG. 6 is a top plan view taken on the line 6—6 of FIG. 5.
Figure 5:
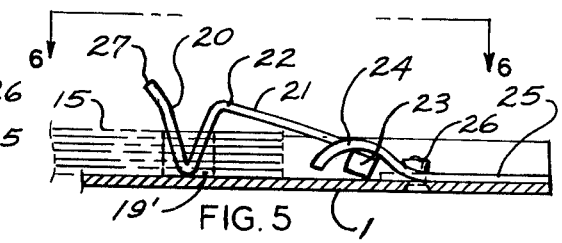
FIG. 5 is a vertical transverse sectional view taken on line 5—5 of FIG. 1.
Figure 7:
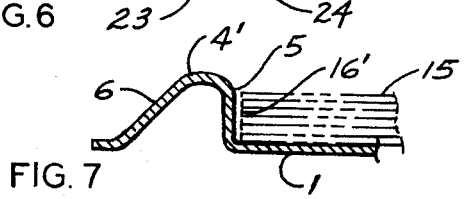
FIG. 7 is a vertical transverse sectional view taken on the line 7—7 of FIG. 1.

Provided for reception within portion 7 of base plate 1 is a plurality of placards 15 of general sheet-like character being constructed from metal or a suitable plastic such as vinyl, and being four-sided, having upper and lower edges 16, 16' for presentation in immediate proximity to the horizontal flange 5 of the adjacent beads 4, 4' (FIG. 7) and inner and outer vertical side edges 17, 17'. Each of said placards is provided adjacent its inner side edge 17 with a pair of spaced-apart apertures 18, 18' being of such vertical extent as to permit uninhibited extension therethrough of binders 8, 8' respectively. With reference to FIG. 3, it will thus be seen that placards 15 will be engaged upon binders 8, 8' in a booklet-froming manner and with the legs 9,9' being of such predetermined extension so that all of the placards 15 may be simultaneously engaged upon either of said legs. Placards 15 are thus in registering relationship and each may be freely swung about binders 8, 8', as the leaves of a book, for disposition in a preselected manner.

Referring again to FIG. 3, it will be seen that the inivdual placards 15 may be easily engaged upon, or removed from binders 8, 8' by suitably manipulating extension 13 so as to allow the withdrawal of placards 15 from engagement with binder 8 by movement along said extension 13 and beyond extremity 14 or by reverse movement for mounted disposition upon binders 8, 8'. The inherent resilience of binders 8, 8' urges extension 13 into abutting relationship with base plate 1 so as to provide a substantially secure joint therebetween to prevent accidental or unauthorized removal of a placard 15 from the said binders 8, 8'.

Each of said placards 15 is also provided adjacent its outer, vertical side margin with a pair of spaced-apart openings 19, 19' which may be transversely aligned with the related apertures 18, 18'. Said openings 19, 19' are presented for receiving a generally U-shaped tongue 20 of a latch 21 having an elongated arm 22 extending toward the related side edges 3, 3' of base plate 1 and being fixed to a cross-shaft member 23 which may be of generally square cross section. Each shaft 23 is received beneath resilient bearing fingers 24, 24' of a mounting bracket 25 secured to base plate 1, as by a rivet, screw or the like 26. Said fingers 24, 24', which are of downwardly arcuate form with their inner or front ends being in subsequential proximity to base plate 1, bear upon the related cross shaft 23 for urging same into its selected position. Tongue 20 at its outer end is provided with a projecting thumb-portion 27 so that the user may effect upward swinging of latch 21 by suitable pressure against thumb-portion 27. It will be observed that upon upward pressure being applied against thumb-portion 27, shaft 23 will be caused to rock against the bias of fingers 24, 24' tending to lift same during such movement and then to allow downward return of said fingers 24, 24' upon completion of such movement whereat the related latch 21 will be in outward or inoperative position as may best be seen at the left hand side of FIGS. 1 and 2.

In view of the foregoing, it will be seen that placards 15 may be firmly retained in selective position by means of latch member 21. The effective extent of tongue 20 is such that the same may be received within the aligned openings 19, 19', as the case may be, of the entire assembly of placards 15 should the same all be disposed on one side or the other of binders 8, 8' as in the position shown in FIG. 1.

Figure 2:
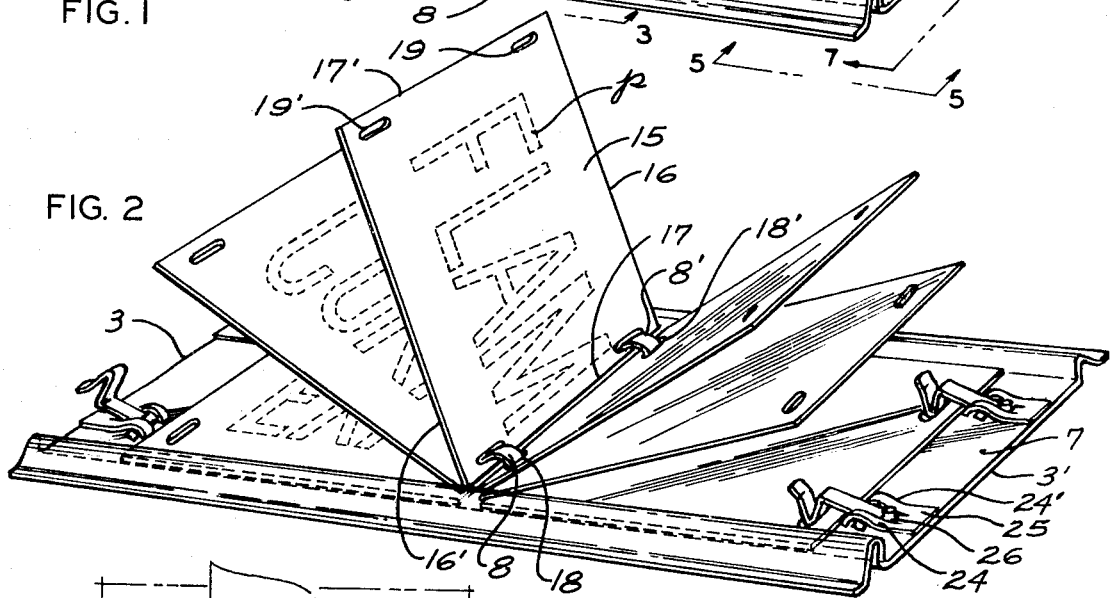
FIG. 2 is a perspective view of the placard and holder, illustrating the placards in open condition.
Figure 4:
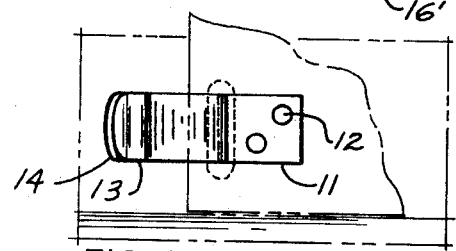
FIG. 4 is a top plan view taken on the line 4—4 of FIG. 3.

Each placard 15 of the assembly, with the exception of the placard at each end of such assembly, as at 15' in FIG. 1, is provided on each of its faces with certain indicia, such as preferrably printed matter, as indicated generally at p, so that the adjacent faces of consecutive placards 15, that is, the confronting faces thereof when the placards 15 are in closed condition as shown in FIG. 1, cooperate to complete a word or expression. With reference being made to FIG. 2, it will be seen that, for example, the exposed face of the outer most placard on the left hand side of binders 8, 8' may carry the first syllable, such as "flam-" of the word "flammable" with the exposed face of the outermost placard 15 on the other side of binder 8, 8' carrying the suffix of such word as "mable." Thereby, with the placards so arranged, the word "flammable" will be presented for indicating the nature of the materials carried by the vehicle. Similarly, other like load-descriptive words may be presented such as the portions "corro-"-"sives" of "corrosives"; "explo-"-"sives" of "explosives"; and so for other like words including, for example, "poison," "radioactive," 'dangerous," "oxidizers," and also composite terms such as "compressed gas," etc. The indicia or printed matter p may be applied to placards 15 in any conventional manner such as by silk screening with the utilization of vinyl inks which are moisture resistent and have proven quite durable under atmospheric conditions. Obviously, said indicia p may incorporate fluorescent agents so as to be readily visible under night conditions.

From the foregoing, the operation of placard holder A should be quite apparent. The said base plate 1 is suitably affixed upon the load-carrying vehicle as at any place thereon as required by statute or regulations. The vehicle operator after being apprised of the type of material to be transported, will then manipulate placards 15 so as to expose the faces of adjacent placards which will present the word or expression describing the load for properly apprising the public of the hazardous nature thereof. As indicated, placards 15 may be swung easily about binders 8, 8', requiring merely a flipping action and latch members 21 at each end of holder A are operated so as to present their tongues 20 within the aligned openings 19, 19' of adjacent placards 15 so as to maintain same, in suitable fashion, in the particular relationship desired. Said latch members 21 thus serve as positive hold-down expedients, preventing any accidental swinging of the placards 15 so as to undesirably alter, or fail to indicate the appropriate designation required of the load involved. In order to alter the presented message, the vehicle operator need merely swing latch members 21 outwardly into open condition, then appropriately turn placards 15 into the requisite arrangement and thereupon return said latch members 21 inwardly into operative, placard-engaging conditions.

When the vehicle is not carrying a load requiring a suitable designation by placard holder A, all of the placards 15 may be turned to one side or the other of binders 8, 8' (FIG. 1) so that the outer face of the particular end placard 15, which is blank, will be presented. It will be further seen that horizontal surfaces 5 of beads 4, 4' restrain placards 15 from any vertical tilting and thus assure of proper disposition of same in usage.

It should be understood that changes and modifications in the formation, construction, arrangement, and combination of the several parts of the placard holder may be made and substituted for these herein shown and described without departing from the nature and principle of my invention.

What is claimed is:

1. A placard holder comprising a base plate, a plurality of placards, each of said placards having an inner and outer side edge and an upper and lower transverse edge, said placards being presented for mutual registering relationship, binding means provided on said base plate, said binding means being of U-shape character and having a pair of parallel legs axially normal to the plane of said base plate, each of said legs being of a greater extent than the composite thickness of the placards when in registering relationship, said placards being engaged adjacent their inner side edge upon the legs of said binding means for swingable movement thereabout, each of said placards further having apertures adjacent their outer side edge, and retaining members constituting latches mounted on said base plate beyond the edges of said placards with a tongue at their normally inner ends for extension into the apertures of the proximate placard, and means for pivotally mounting said latches at their normally outer end portions upon said base plate to render same swingable between placard-engaged and placard-disengaged relationship.

2. A placard holder as defined in claim 1 and further characterized by indicia provided on the faces of said placards and being so arranged so that the indicia on adjacent faces of immediate consecutive placards will cooperate to set forth a completed message.

3. A placard holder as defined in claim 1 and further characterized by said base plate having parallel, spaced-apart beads for preventing accidental askew swinging of said placards.

4. A placard holder as defined in claim 1 and further characterized by said base plate having a length greater than twice the length of said placards for defining a transverse marginal portion on said base plate adjacent said placard outer edges, said latches being mounted on said marginal portion.

5. A placard holder as defined in claim 1 and further characterized by said tongue including resilient means for urging said latches in received relationship within the respective apertures.

References Cited

UNITED STATES PATENTS

| | | | |
|---|---|---|---|
| 959,479 | 5/1910 | Doolittle | 40—119 X |
| 1,685,080 | 9/1928 | Auchincloss | 40—102 X |
| 1,786,230 | 12/1930 | Davis | 40—119 |
| 1,727,336 | 9/1929 | Cooper | 40—104.18 |
| 3,455,044 | 7/1969 | Falconbridge et al. | 40—102 X |

FOREIGN PATENTS

| | | |
|---|---|---|
| 45,865 | 12/1908 | Switzerland. |

WILLIAM H. GRIEB, Primary Examiner

U.S. Cl. X.R.

116—28